(12) United States Patent
Banke, Jr. et al.

(10) Patent No.: US 8,990,961 B2
(45) Date of Patent: Mar. 24, 2015

(54) NON-LINEARITY DETERMINATION OF POSITIONING SCANNER OF MEASUREMENT TOOL

(75) Inventors: George W. Banke, Jr., Essex Junction, VT (US); James M. Robert, Burlington, VT (US); Carlos Strocchia-Rivera, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 13/217,579

(22) Filed: Aug. 25, 2011

(65) Prior Publication Data
US 2011/0314576 A1 Dec. 22, 2011

Related U.S. Application Data

(62) Division of application No. 12/013,787, filed on Jan. 14, 2008, now Pat. No. 8,037,736.

(51) Int. Cl.
*G01Q 30/04* (2010.01)
*G01Q 30/06* (2010.01)
(Continued)

(52) U.S. Cl.
CPC ............ *G01B 21/042* (2013.01); *G01Q 40/00* (2013.01); *G01B 21/045* (2013.01); *G01Q 30/06* (2013.01); *B82Y 35/00* (2013.01); *G01Q 30/04* (2013.01)
USPC .................. 850/19; 702/116; 850/10; 850/11

(58) Field of Classification Search
CPC .... B82Y 35/00; G01B 21/042; G01B 21/045; G01Q 30/04; G01Q 30/06; G01Q 40/00
USPC ................... 73/1.79–1.81, 1.89; 324/750.02; 702/85, 94, 116, 199, FOR. 160, 702/FOR. 165, FOR. 167; 850/1, 8, 10–11, 850/19
See application file for complete search history.

(56) References Cited

U.S. PATENT DOCUMENTS

| 4,257,053 A | 3/1981 | Gilbreath |
| 5,898,106 A | 4/1999 | Babcock et al. |

(Continued)

FOREIGN PATENT DOCUMENTS

| DE | 227583 A | 9/1985 |
| EP | 0214863 A2 | 3/1987 |

(Continued)

OTHER PUBLICATIONS

Joseph Fu, "In situ testing and calibrating of z-piezo of an atomic force microscope," Rev. Sci. Instrum., vol. 66, No. 7, Jul. 1995, pp. 3785-3788.

(Continued)

*Primary Examiner* — Thomas P Noland
(74) *Attorney, Agent, or Firm* — Anthony J. Canale; Hoffman Warnick LLC

(57) ABSTRACT

Determination of non-linearity of a positioning scanner of a measurement tool is disclosed. In one embodiment, a method may include providing a probe of a measurement tool coupled to a positioning scanner; scanning a surface of a first sample with the surface at a first angle relative to the probe to attain a first profile; scanning the surface of the first sample with the surface at a second angle relative to the probe that is different than the first angle to attain a second profile; repeating the scannings to attain a plurality of first profiles and a plurality of second profiles; and determining a non-linearity of the positioning scanner using the different scanning angles to cancel out measurements corresponding to imperfections due to the surface of the sample. The non-linearity may be used to calibrate the positioning scanner.

11 Claims, 6 Drawing Sheets

(51) Int. Cl.
*G01Q 40/00* (2010.01)
*G01B 21/20* (2006.01)
*B82Y 35/00* (2011.01)
*G01B 21/04* (2006.01)

(56) References Cited

U.S. PATENT DOCUMENTS

| | | | |
|---|---|---|---|
| 7,209,242 | B2 | 4/2007 | Nakamura et al. |
| 2003/0231261 | A1 | 12/2003 | Bassi et al. |
| 2004/0165056 | A1 | 8/2004 | Allen et al. |
| 2005/0134143 | A1 | 6/2005 | Cannon et al. |
| 2007/0161890 | A1 | 7/2007 | Hariharan et al. |
| 2007/0177241 | A1 | 8/2007 | Keh et al. |
| 2008/0002197 | A1 | 1/2008 | Sun et al. |
| 2008/0031407 | A1 | 2/2008 | Satta et al. |
| 2008/0074719 | A1 | 3/2008 | Han |
| 2008/0106466 | A1 | 5/2008 | Kelley et al. |
| 2013/0175433 | A1* | 7/2013 | Kishimoto ............. 250/208.1 |
| 2014/0315319 | A1* | 10/2014 | Park et al. ............. B82Y 35/00 |

FOREIGN PATENT DOCUMENTS

| | | |
|---|---|---|
| JP | 61-25118 A | 2/1986 |
| JP | 04157302 A2 | 5/1992 |
| JP | 06147821 A2 | 5/1994 |
| JP | 08233836 A2 | 9/1996 |
| JP | 2002040352 A | 2/2002 |

OTHER PUBLICATIONS

Japanese Patent Office, Machine Translation of above cited Publication No. JP2002040352A dated Feb. 6, 2002, 26 pages.

\* cited by examiner

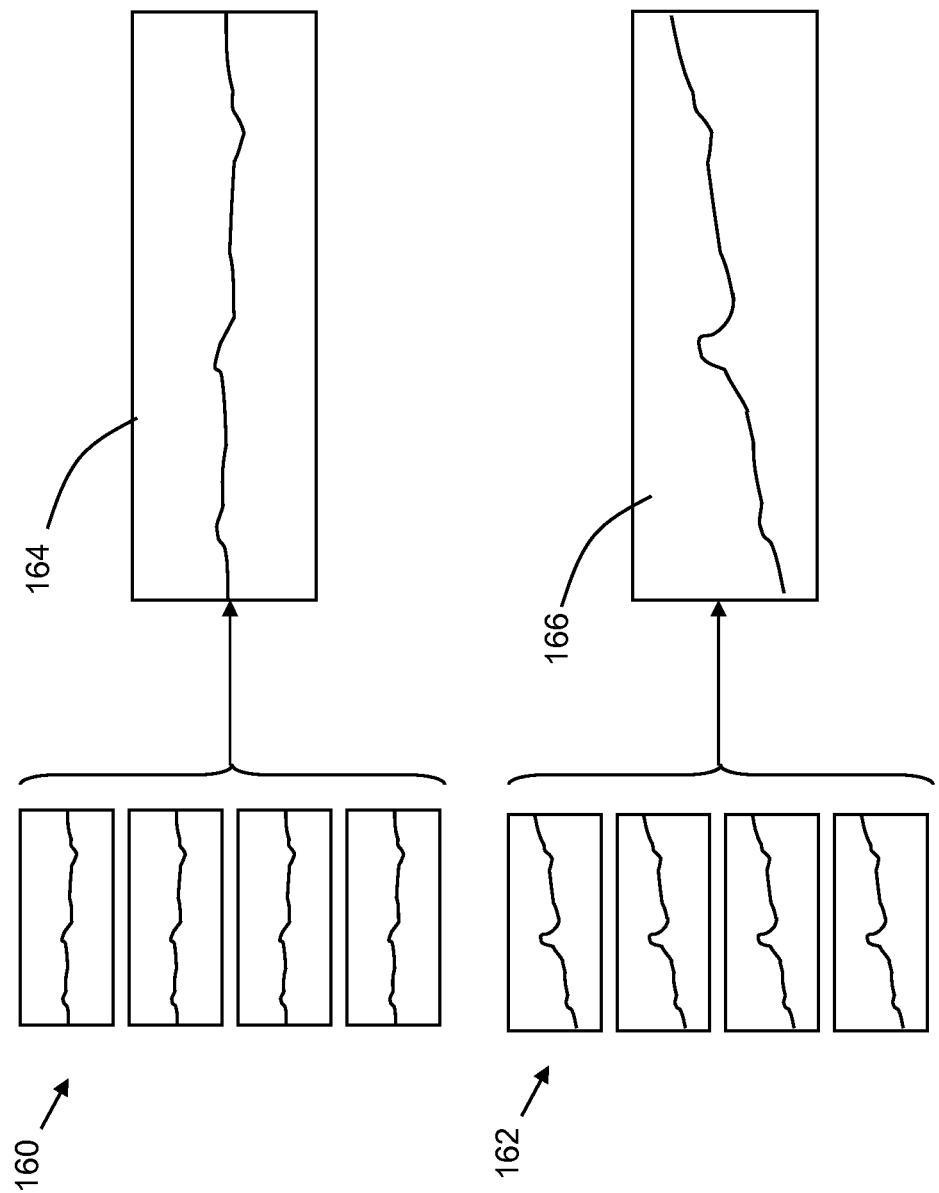

NON-LINEARITY DETERMINATION OF POSITIONING SCANNER OF MEASUREMENT TOOL

REFERENCE TO PRIOR APPLICATIONS

This application is a Divisonal application of co-pending U.S. patent application Ser. No. 12/013,787, filed on Jan. 14, 2008, which is hereby incorporated by reference.

BACKGROUND

1. Technical Field

The disclosure relates generally to measurement systems, and more particularly, to calibration of measurement systems.

2. Background Art

Calibration of measurement systems used in, for example, measuring IC chips during or after manufacturing, is essential to attain accurate measurements. Current practices of checking linearity and calibrating vertical displacement of a measurement tool use several step height standards. The same is true for horizontal displacement. That is, the tool is used to measure a number of structures having known heights or known pitch standards for horizontal displacement. Limitations on the availability of these standards and the uncertainty of the standards make this approach inadequate.

SUMMARY

Determination of non-linearity of a positioning scanner of a measurement tool is disclosed. In one embodiment, a method may include providing a probe of a measurement tool coupled to a positioning scanner; scanning a surface of a first sample with the surface at a first angle relative to the probe to attain a first profile; scanning the surface of the first sample with the surface at a second angle relative to the probe that is different than the first angle to attain a second profile; repeating the scannings to attain a plurality of first profiles and a plurality of second profiles; and determining a non-linearity of the positioning scanner using the different scanning angles to cancel out measurements corresponding to imperfections due to the surface of the sample. The non-linearity may be used to calibrate the positioning scanner.

A first aspect of the disclosure provides a method comprising: providing a probe of a measurement tool coupled to a positioning scanner; scanning a surface of a first sample with the surface at a first angle relative to the probe to attain a first profile; scanning the surface of the first sample with the surface at a second angle relative to the probe that is different than the first angle to attain a second profile; repeating the scannings to attain a plurality of first profiles and a plurality of second profiles; and determining a non-linearity of the positioning scanner using the different scanning angles to cancel out measurements corresponding to imperfections due to the surface of the sample.

A second aspect of the disclosure provides a system comprising: a measurement tool including a probe coupled to a positioning scanner; a fixture for holding a sample for scanning a surface of the sample with the surface at a first angle relative to the probe to attain a plurality of first profiles, and scanning the surface of the sample with the surface at a second angle relative to the probe that is different than the first angle to attain a plurality of second profiles; and a determinator for determining a non-linearity of the positioning scanner using the different scanning angles to cancel out measurements corresponding to imperfections due to the surface of the sample.

A third aspect of the disclosure provides a program product stored on a computer-readable medium, which when executed, determines a non-linearity of a positioning scanner of a measurement tool, the program product comprising: program code for controlling scanning a surface of a sample with the surface at a first angle relative to a probe coupled to the positioning scanner to attain a first profile; program code for controlling scanning the surface of the sample with the surface at a second angle relative to the probe that is different than the first angle to attain a second profile; program code for controlling repeating the scannings to attain a plurality of first profiles and a plurality of second profiles; and program code for determining a non-linearity of the positioning scanner using the different scanning angles to cancel out measurements corresponding to imperfections due to the surface of the sample.

A fourth aspect of the disclosure includes a scanning probe microscope comprising: a probe coupled to a positioning scanner; a fixture for holding a sample for scanning a surface of the sample with the surface at a first angle relative to the probe to attain a plurality of first profiles, and scanning the surface of the sample with the surface at a second angle relative to the probe that is different than the first angle to attain a plurality of second profiles; and a determinator for determining a non-linearity of the positioning scanner using the different scanning angles to cancel out measurements corresponding to imperfections due to the surface of the sample.

A fifth aspect of the disclosure provides a computer-readable medium that includes computer program code to enable a computer infrastructure to determine a non-linearity of a positioning scanner of a measurement tool, the computer-readable medium comprising computer program code for performing the method steps of the disclosure.

A sixth aspect of the disclosure provides a method of generating a system for determining a non-linearity of a positioning scanner of a measurement tool, the method comprising: obtaining a computer infrastructure; and deploying means for performing each of the steps of the disclosure to the computer infrastructure.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 4 shows a comparison of profiles illustrating the non-linearity determining according to the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
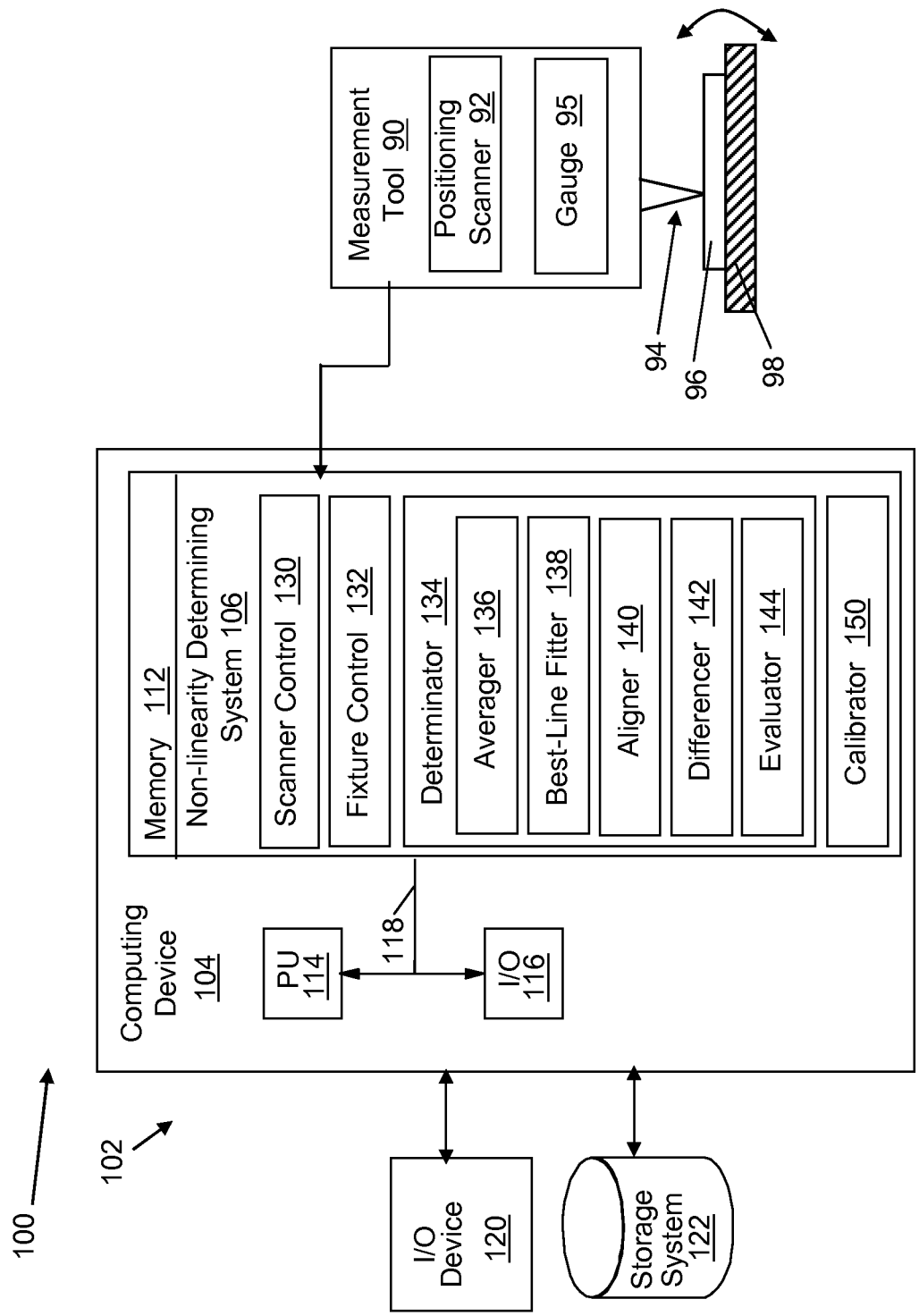
FIG. 1 shows a block diagram of an illustrative environment including a non-linearity determining system according to the disclosure.

Turning to the drawings, FIG. 1 shows an illustrative environment 100 of a measurement tool according to the disclosure. To this extent, environment 100 includes a computer infrastructure 102 that can perform the various process steps described herein for determining a non-linearity of a positioning scanner 92 of a measurement tool 90. In particular, computer infrastructure 102 is shown including a computing device 104 that comprises a non-linearity determination system 106, which enables computing device 104 to determine and/or correct a non-linearity of a positioning scanner of a measurement tool by performing the process steps of the disclosure.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as non-linearity determining system 106, that is stored in memory 112 and/or storage system 122. While executing computer program code, processor 114 can read and/or write data, such as measurements, scanning profiles, etc., to/from memory 112, storage system 122, and/or I/O interface 116. Bus 118 provides a communications link between each of the components in computing device 104. I/O device 118 can comprise any device that enables a user to interact with computing device 104 or any device that enables computing device 104 to communicate with one or more other computing devices. Input/output devices (including but not limited to keyboards, displays, pointing devices, etc.) can be coupled to the system either directly or through intervening I/O controllers.

In any event, computing device 104 can comprise any general purpose computing article of manufacture capable of executing computer program code installed by a user (e.g., a personal computer, server, handheld device, etc.). However, it is understood that computing device 104 and non-linearity determining system 106 are only representative of various possible equivalent computing devices that may perform the various process steps of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

Measurement tool 90 may include any now known or later developed system for measuring that includes positioning scanner 92 and probe 94, e.g., a scanning probe microscope (SPM), atomic force microscope, profilometer or other form of mechanical probe system, including electron and optical probing systems. Probe 94 may be contacting or non-contacting. Measurement tool 90 may be a contact type tool or a non-contact type tool, or may have a selective contact mode and a non-contact mode. As understood, probe 94 is scanned over a surface of sample 96 and measures an interaction between the surface and the probe, resulting in an electronic profile, i.e., an image including, for example, surface topography. Measurement tool 90 may include non-linearity determining system 106 or it may be a separate system. In any event, measurement tool 90 can include a capacitance gauge 95, or some other gauge as a feedback control for positioning scanner 92. Capacitance gauge 95 is used to monitor the position of positioning scanner 92. Feedback from capacitance gauge 95 can be used to moderate the input voltage to positioning scanner 92 so the scanner will move in a controlled motion to precisely determine vertical position (height) versus lateral position. That is, piezoelectric material is used to finely position positioning scanner 92 and thus probe 94 laterally (X-Y plane) and vertically (Z plane). This functioning may be incorporated in a closed-loop feedback system, or the feedback system may be omitted. Positioning scanner 92 controls voltage to the actuator to extend probe 94 towards sample 96 so that the probe tracks the surface. As one with skill in the art will recognize, measurement tool 90 may include a variety of other sub-systems and components not illustrated in FIG. 1. Measurement tool 90 is shown for use with one or more samples 96 positioned on a fixture 98.

Figure 3A:
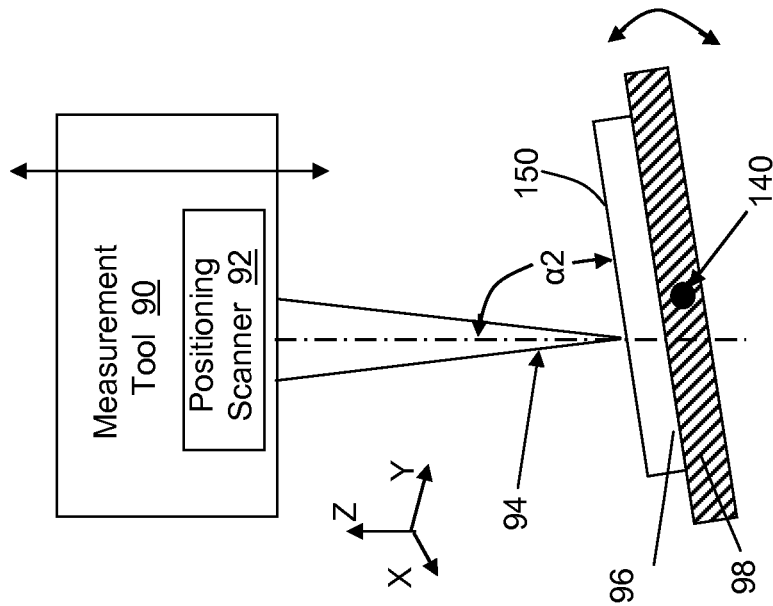
FIGS. 3A-3B show schematic diagrams of the non-linearity determining according to the disclosure.
Figure 3B:
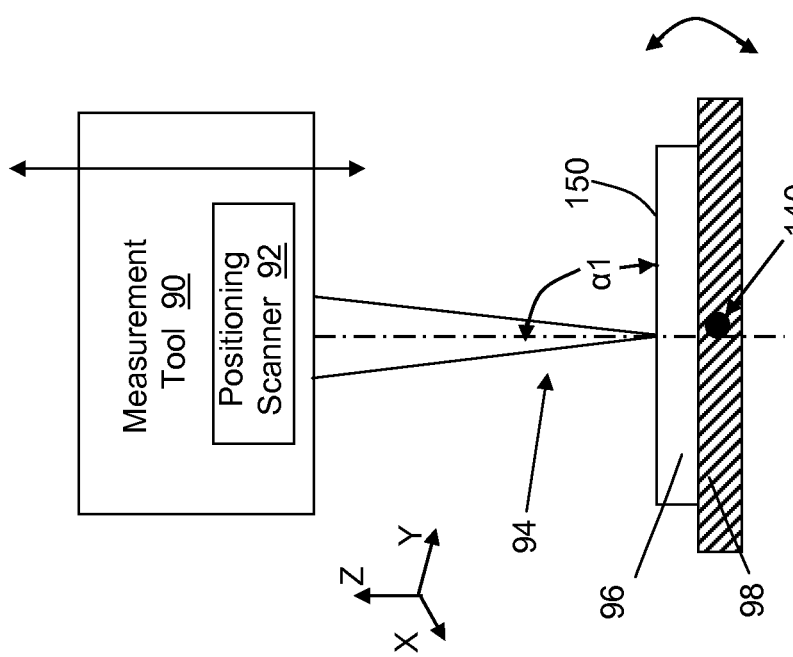

Fixture 98 may include any now known or later developed sample holding mechanism capable of angling the sample(s) 96 about a horizontal axis (see FIG. 3), and consistently holding sample 96 such that reproducible results can be obtained. Fixture 98 may have predefined angles of tilt to hold sample 96 to achieve a desired vertical (Z) translation for a given amount of lateral (X or Y) axis translation. More specifically, fixture 98 may include any now known or later developed structure to allow the necessary lateral, vertical and angling of sample 96, e.g., motors, cams, electronic controls, etc. The method described here is also applicable for determining the non-linearity of scanners in the X,Y plane. A sample for doing this would have its scan surface perpendicular to the X, Y plane and be positioned and scanned at two different angles to cancel the scan surface roughness from the intrinsic non-linearity of the X or Y scanners.

As previously mentioned and discussed further below, non-linearity determining system 106 enables computing infrastructure 102 to, among other things, determine a non-linearity of positioning scanner 92 of measurement tool 90. To this extent, non-linearity determining system 106 is shown including a scanner control 130, a fixture control 132, a determinator 134 including an averager 136, a best line fitter 138, an aligner 140, a differencer 142 and an evaluator 144. In addition, a calibrator 150 for calibrating positioning scanner 92 may also be provided. Operation of each of these systems is discussed further below. However, it is understood that some of the various systems shown in FIG. 1 can be implemented independently, combined, and/or stored in memory for one or more separate computing devices that are included in computer infrastructure 102. Further, it is understood that some of the systems and/or functionality may not be implemented, or additional systems and/or functionality may be included as part of environment 100.

Figure 2:
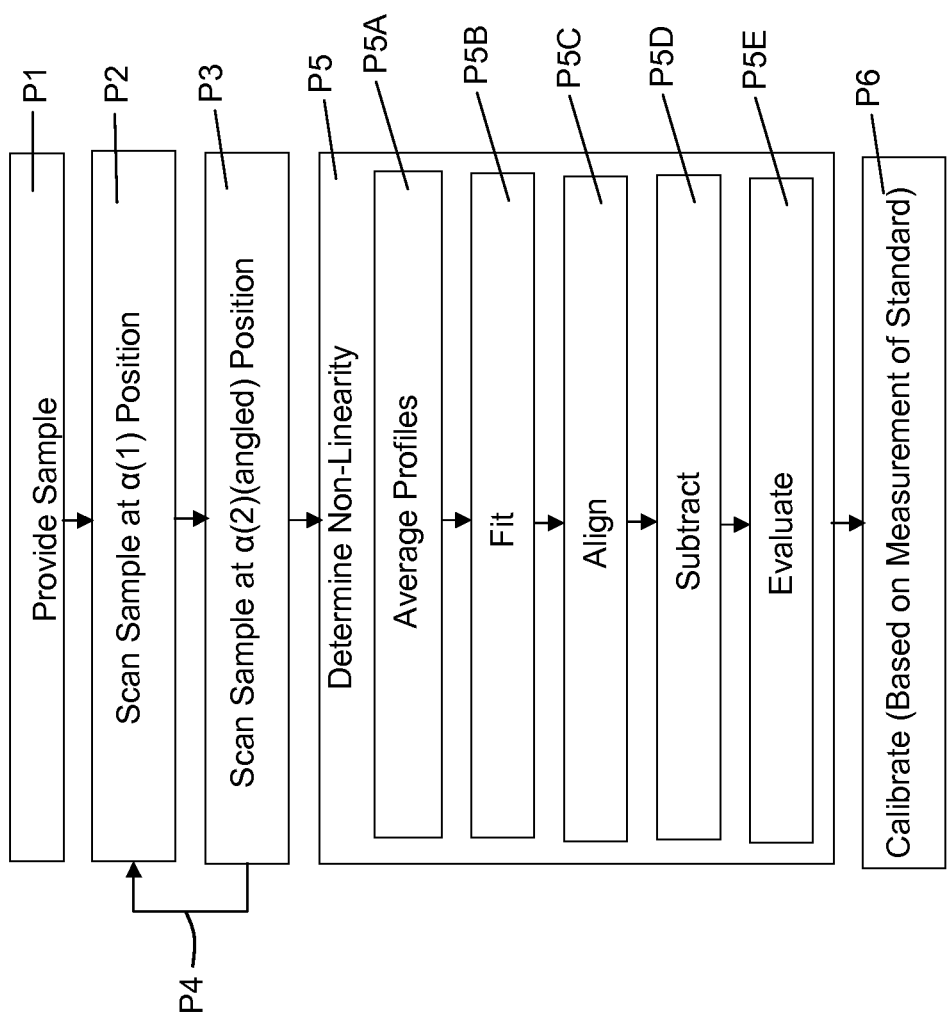
FIG. 2 shows a flow diagram of embodiments of the non-linearity determining system of FIG. 1 according to the disclosure.

Referring to FIGS. 2-3 in conjunction with FIG. 1, embodiments of a method of operation of non-linearity determining system 106 will now be described for the case of determining vertical displacement nonlinearity. In process P1, probe 94 of measurement tool 90 is provided coupled to positioning scanner 92. As shown in FIGS. 2-3, a sample 96 is positioned on a fixture 98 that is capable of angling about a horizontal axis 140. (Axis 140 could be a vertical axis to enable the X or Y non-linearity determination.) Fixture 98 movement is controlled by fixture control 132, as will be described herein.

In process P2, scanner control 130 controls scanning of a surface 150 of sample 96 at a first angle ($\alpha 1$) relative to probe 94 to attain a first profile, i.e., measured electronic representation of surface 150. That is, scanner control 130 controls the data recordation by measurement tool 90, positioning scanner 92, and any other required component of measurement tool 90. As illustrated, first angle ($\alpha 1$) is substantially 90° relative to the probe such that sample 96 is at or near horizontal; however, other angles may be used. (In the X or Y non-linearity assessment, the first angle is substantially parallel to either the X or the Y axis while the second angle (as in process P3) is any angle sufficient to achieve the desired travel in the X or Y axis.) Sample 96 may include, for example, a patterned integrated circuit (IC) chip. Preferably, sample 96 provides a smooth surface and the patterned silicon provides a navigation aid to ensure the return of subsequent scanning to the same starting position to minimize sample surface 150 variation due to stage positioning variance.

In process P3, scanner control 130 controls scanning surface 150 of first sample 96 with the surface at a second angle ($\alpha 2$) relative to probe 92 that is different than the first angle to attain a second profile. As illustrated, second angle ($\alpha 2$) is approximately 81° relative to the probe; however, other angles may be used. That is, fixture control 132 tilts sample 96 about horizontal axis 140 by approximately 9°, e.g., by activating a motorized tilting mechanism in fixture 98. In any event, second angle ($\alpha 2$) results in sample 96 being inclined, causing positioning scanner 92 to move probe 94 both laterally (X and/or Y direction) and vertically (Z direction) to accommodate the inclined sample 96.

In process P4, scanner control 130 repeats the scannings (process P2-P3) to attain a plurality of first profiles and a plurality of second profiles. It is understood that the repeating of scanning of sample 96 does not necessarily have to occur with intermittent first angle and second angle positions, as shown in FIG. 2. If this intermittent process was chosen, an alternative approach could be to use a single iteration of scans, do the fitting, the scan alignment of the residuals, subtraction, and then repeat this process to compare result 180 (collection of scans) for evaluation. That is, as shown in FIG. 4, repetitive scanning at first angle could occur, followed by repetitive scanning at second angle. Any number of repetitive scans to ensure accurate measurement may be used.

Figure 6:
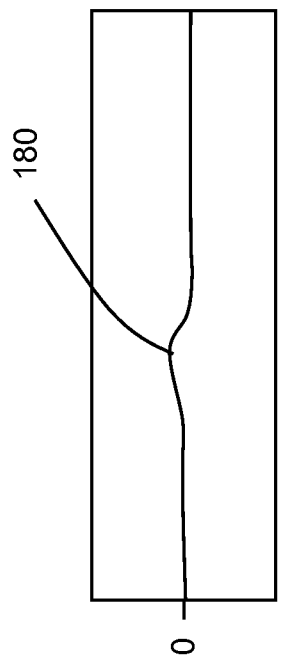
FIG. 6 shows a difference between the profiles for determining non-linearity.
Figure 5:
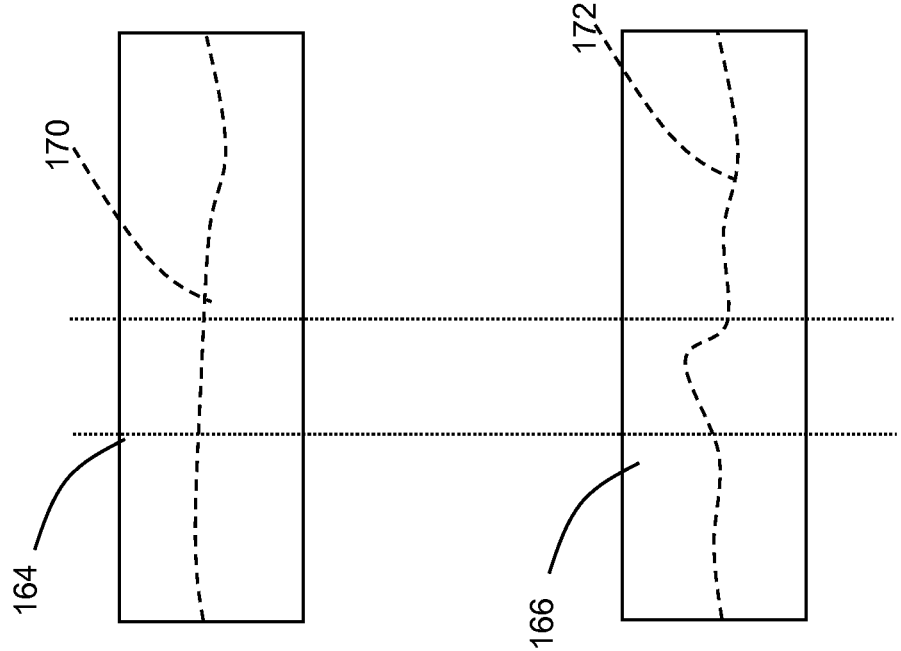
FIG. 5 shows residuals of profiles after linear regression.

In process P5, determinator 134 determines a non-linearity of positioning scanner 92 using the different scanning angles to cancel out measurements corresponding to imperfections due to surface 150 of sample 96. This process may take a variety of forms. In one embodiment, in process P5A, as shown in FIG. 4, averager 136 averages plurality of first profiles 160 and averages plurality of second profiles 162, resulting in averaged first profiles 164 and averaged second profiles 166. As shown in FIG. 5, in process P5B, best-line fitter 138 performs a linear regression (e.g., a Mandel or ordinary least squares regression) on averaged first profiles 164 and averaged second profiles 166 to fit them to a first order best-fit line, and calculates residuals (shown in dashed lines) from the first order best-fit lines. That is, the data is normalized by the process of fitting the data to a straight line and capturing the residuals. The residuals of the linear regression are the vertical deviations (both − and +) about the line. The residuals, by definition, have the slope of the line (and tilt of the sample) removed. Therefore, the residuals are the deviations from perfect linear behavior. This "normalization" allows comparison of the flat state of the sample with next to no Z displacement with that of tilted state with lots of Z displacement. As also shown in FIG. 5, in process P5C, aligner 140 aligns residuals of a best-fit line 170 of averaged first profiles 164 and residuals of a best fit-line 172 of averaged second profiles 166. The vertical dashed lines over residuals of best-fit line 170 of averaged first profiles 164 and residuals of best-fit line 172 of averaged second profiles 166 illustrate a potential non-linearity, which can be used for the alignment of residuals 172 to residuals 170. FIG. 6 shows the result of process P5D in which differencer 142 subtracts the residuals of averaged first profiles 164 from the residuals of averaged second profiles 166 after the aligner 140 positions residuals 170 and 172 relative to each other. A result 180 identifies non-linearities of positioning scanner 92 since subtracting cancels out measurements corresponding to imperfections due to surface 150 of sample 96. This principle is due to the invariance of surface 150 at the two different tilt angles shown in FIGS. 3A and 3B. The tilt of sample surface 150 at second angle ($\alpha 2$) exercises the vertical Z displacement of positioning scanner 92 thus the subtraction of sample surface 150 variations leaves the remaining Z displacement non-linearity. In process P5E, evaluator 144 evaluates a result 180 (FIG. 6) of the subtracting to identify the non-linearity of the positioning scanner, e.g., the areas that are not zero represent non-linearities in positioning scanner 92 operation.

Figure 7:
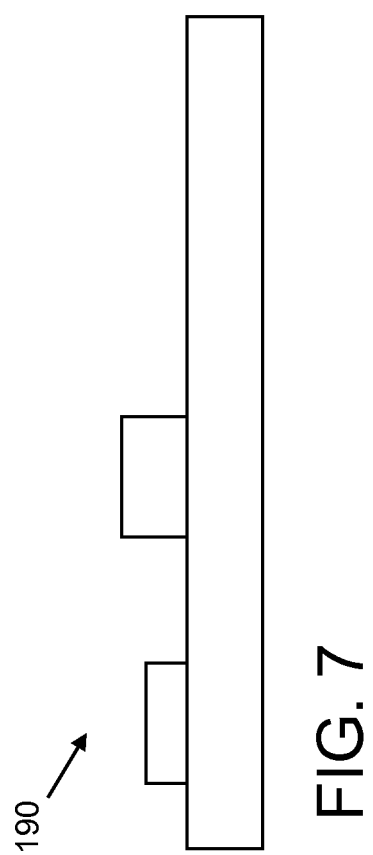
FIG. 7 shows an illustrative calibrated Z height measurement sample.

In the example illustrated, the behavior shown in profiles 162 of FIG. 4 indicates the non-linearity may be systematic. The Root-Mean-Square (RMS) of result 180 will result in a good estimate of the standard deviation multiple (e.g., 3-sigma) uncertainty of the scanner due to non-linearity. If uncertainty is too large, then a higher order regression can remove this systematic non-linearity. This regression equation would be used to correct for this systematic non-linearity of the scanner, and a new RMS would be calculated smaller than the previously calculated RMS yielding a smaller non-linear uncertainty. Returning to FIG. 2 in conjunction with FIG. 7, in an optional embodiment, scanner control 130 may further be used to measure a calibrated Z height measurement sample 190, i.e., a calibrated sample including a minimum of one known Z height standard, thus linking all of the Z values. A single calibrated step height standard is needed if the surfaces of sample 190 have the similar roughness thus similar scanning probe 94 to sample 150 interaction for the substrate and step surfaces of 190 in FIG. 7. If these probe to sample interactions are significantly different, a minimum of 2 calibrated standards would be required to test that the scaling of the scanner is significantly different from unity. Based on this measurement, calibrator 150 (FIG. 1) may calibrate an entire Z range of measurement tool 90 based on the Z height measurement sample. Once the non-linearity 180 of the vertical displacement is determined, this information with a single standard fully describes the deviation from perfect linear behavior of the Z displacement for the tested range of the Z displacement. Similarly, for the cases of the assessment of the X and Y linearity, a single pitch standard would be required to calibrate the entire assessed X and Y scanner range.

As discussed herein, various systems and components are described as "obtaining" data (e.g., measurements, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

While shown and described herein as a method and system for determining non-linearity of positioning scanner 92, it is understood that the disclosure further provides various alternative embodiments. That is, the disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc. In one embodiment, the disclosure can take the form of a computer program product accessible from a computer-usable or computer-readable medium providing program code for use by or in connection with a computer or any instruction execution system, which when executed, enables a computer infrastructure to determine the non-linearity of positioning scanner 92. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, such as memory 122, magnetic tape, a removable computer diskette, a random access memory (RAM), a read-only memory (ROM), a tape, a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processing unit 114 coupled directly or indirectly to memory elements through a system bus 118. The memory elements can include local memory, e.g., memory 112, employed during actual execution of the program code, bulk storage (e.g., memory system 122), and cache memories which provide temporary storage of at least some program code in order to reduce the number of times code must be retrieved from bulk storage during execution.

In another embodiment, the disclosure provides a method of generating a system for determining non-linearity of positioning scanner 92. In this case, a computer infrastructure, such as computer infrastructure 102 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 104 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the disclosure.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
a measurement tool including a probe coupled to a positioning scanner;
a fixture for holding a sample for scanning a surface of the sample with the surface at a first angle relative to the probe to attain a plurality of first profiles, wherein the first angle is substantially 90° relative to the probe, and scanning the surface of the sample with the surface at a second angle relative to the probe that is different than the first angle to attain a plurality of second profiles, the second angle being able to be any angle that results in a predetermined amount of lateral travel of the probe; and
a determinator for determining a non-linearity of the positioning scanner using the different scanning angles to cancel out measurements corresponding to imperfections due to the surface of the sample.

2. The system of claim 1, wherein the probe is a non-contacting probe.

3. The system of claim 1, wherein the sample includes a patterned integrated circuit (IC) chip.

4. The system of claim 1, wherein the second angle is approximately 81° relative to the surface of the sample.

5. The system of claim 1, further comprising:

a calibrator for calibrating an entire Z range of the measurement tool based on a Z height measurement sample.

6. The system of claim 1, wherein the measurement tool includes a scanning probe microscope (SPM).

7. The system of claim 1, wherein the determinator:

averages the plurality of first profiles and averages the plurality of second profiles;

fits the averaged first profiles and the averaged second profiles to a first order best-fit line;

aligns the averaged first profiles and the averaged second profiles;

subtracts the best-fit line of averaged first profiles from the best-fit line of averaged second profiles; and evaluates a result of the subtracting to identify the non-linearity of the position scanner.

8. A scanning probe microscope comprising:

a probe coupled to a positioning scanner;

a fixture for holding a sample for scanning a surface of the sample with the surface at a first angle relative to the probe to attain a plurality of first profiles, wherein the first angle is substantially 90° relative to the probe, and scanning the surface of the sample with the surface at a second angle relative to the probe that is different than the first angle to attain a plurality of second profiles, the second angle being able to be any angle that results in a predetermined amount of lateral travel of the probe; and a determinator for determining a non-linearity of the positioning scanner using the different scanning angles to cancel out measurements corresponding to imperfections due to the surface of the sample.

9. The scanning probe microscope of claim 8, wherein the probe is a non-contacting probe.

10. The scanning probe microscope of claim 8, wherein the sample includes a patterned integrated circuit (IC) chip.

11. The scanning probe microscope of claim 8, wherein the second angle is approximately 81° relative to the probe.

* * * * *